Feb. 25, 1930.  L. M. LOEB  1,748,234
METAL CABINET FOR HOUSING ELECTRIC LIGHT
AND POWER DISTRIBUTION PANEL BOARDS
Filed May 7, 1928

Inventor
Laurence M. Loeb,
By his Attorney
Geo. H. Byrne.

Patented Feb. 25, 1930

1,748,234

UNITED STATES PATENT OFFICE

LAURENCE M. LOEB, OF NEW ROCHELLE, NEW YORK

METAL CABINET FOR HOUSING ELECTRIC LIGHT AND POWER DISTRIBUTION PANEL BOARDS

Application filed May 7, 1928. Serial No. 275,695.

The present invention relates to improvement in metal cabinets principally adapted for housing electric light and power distribution panelboards on which are generally secured the switches, plug fuses, etc.

The general object of the invention is to construct the cabinet in combination with a wall so that the cabinet will be hidden from sight and yet be readily accessible when occasion requires and to this end the invention resides in providing the wall with an opening in which is secured a cabinet having a hinged door, and in constructing the cabinet and its door so that when in position they will permit the application of plaster to finish perfectly flush with the wall making the cabinet practically invisible.

Figure 1:
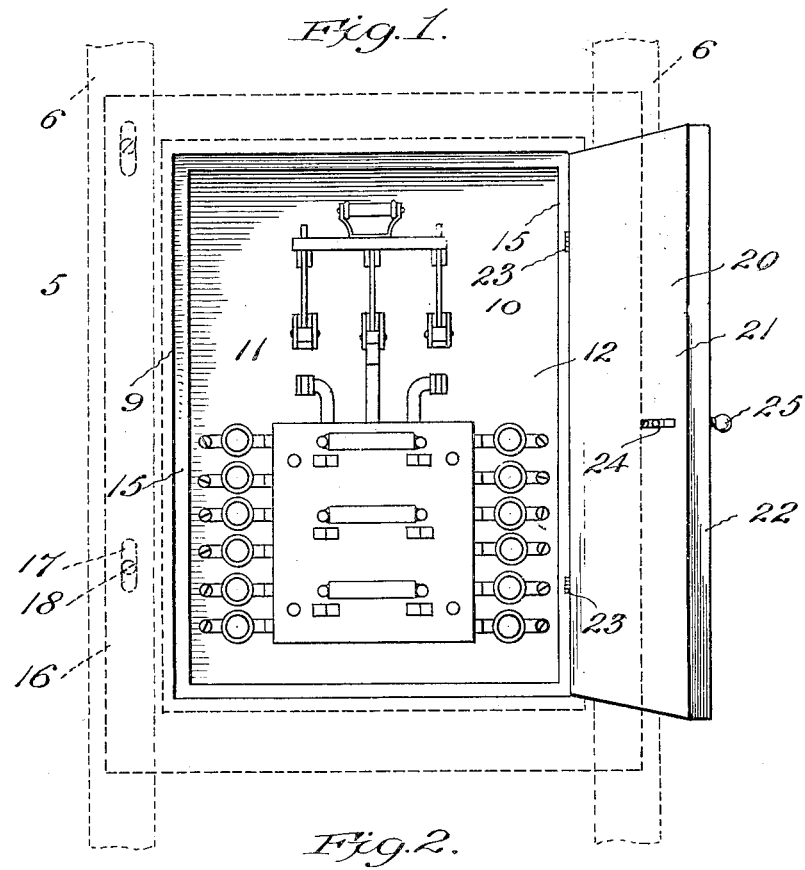

Other objects will appear and be better understood from that embodiment of my invention of which the following is a specification, reference being had to the accompanying drawings forming a part thereof, in which Figure 1 is a front elevational view of the cabinet secured in position on a wall, and shown housing a panelboard and with the door in its open position.

Figure 2:
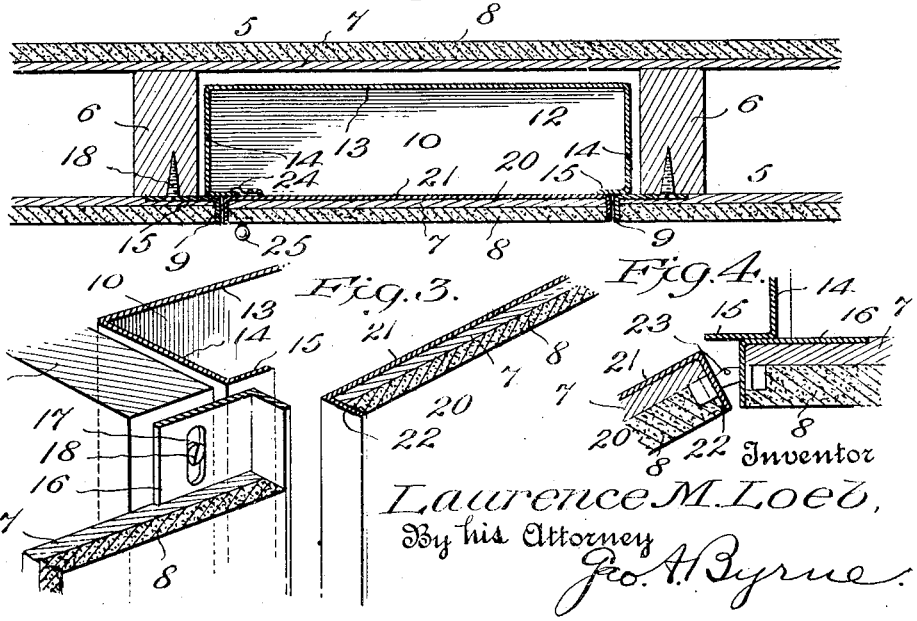

Figure 2 is a horizontal cross sectional view with the panelboard removed and the door in its closed position.

Figure 3:
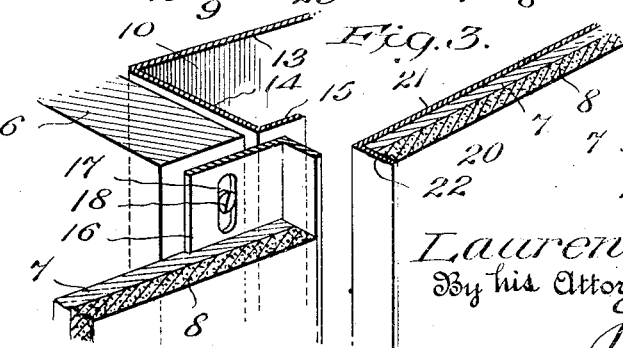
Figure 4:

Figure 3 is an enlarged detail perspective view of a fragmental portion of the cabinet and wall and Figure 4 is an enlarged detail cross sectional view showing the invisible hinge connection between the door and casing.

Heretofore metal cabinets used for housing electric light and power distribution panelboards are usually bolted or otherwise secured to the outer face of a wall. When so positioned on a wall they present a very unsightly and unattractive appearance and readily form a convenient place for the accumulation of dust and dirt.

It is the purpose of this invention to overcome these defects and to construct a cabinet and secure the same in position on a wall so that it will be practically invisible and thus not mar the æsthetic value of a room or building as generally desired in the construction of the higher type of building today.

In the drawings 5 designates the wall of a building formed in the usual manner, such as by the vertical spaced studs 6, lath or celotex surfaces 7 and plaster surfaces 8.

The wall is provided with an opening 9 for receiving the cabinet 10 within which is secured the usual electric light and power distribution panelboard 11. The cabinet is preferably formed of sheet metal and comprises the casing or box portion 12 having a back 13 and sides and ends 14 which are bent inwardly to provide a flanged edge portion 15. Secured to the flange in any suitable manner, as by being riveted or welded, is an outwardly extending angle iron frame 16. This frame is provided with a number of slotted openings 17 and is arranged to overlie the studs 6 so that screws 18 may be passed through the openings and into the studs for securing the box or casing in position.

The door 20 is also formed of sheet metal and comprises a back 21 bent to provide outwardly extending side and end portions 22. The door is connected to one side of the frame 16 by means of any suitable type of invisible hinges 23 and is held in a closed position by means of any suitable type of spring latch 24 secured to the door and arranged to engage the flange of the casing as shown in Figure 2. Any suitable means, such as a glass knob 25, may be provided for opening the door when required, or the knob may be left off if desired and a suitable implement inserted between the edge of the door and the casing frame to open the door against the action of the spring latch.

The lath or celotex 7 may be secured to the door and to the frame 16 in any well known manner and over this is secured the usual plastic covering 8.

The door when in its closed position snugly fits within the frame of the casing so that its outer surface will be flush with the outer surface of the wall and permit the application of plaster to the plane of the exposed edges of the door and casing frame.

It is obvious that those skilled in the art may vary the details of construction and arrangement of parts without departing from the spirit of the invention, and, therefore I do not wish to be limited to such features, except as may be required by the claims.

What I claim is:—

1. In combination with a wall having an opening, a metal cabinet fitted within said opening and comprising a casing, a flange extending outwardly from the casing, and acting as a ground for the plastering material of the wall, and a door comprising metal side and end portions and a plaster covering for the door of the same finish as that of the wall and substantially flush therewith.

2. In combination with a wall having an opening, a metal cabinet fitted within said opening and comprising a casing, a flange extending outwardly from the casing, and acting as a ground for the plastering material of the wall, and a door comprising metal side and end portions and a plaster covering for the door of the same finish as that of the wall and substantially flush therewith, said outwardly extending flange having a lateral projection provided with slots for the reception of securing means whereby the cabinet may be secured in proper adjusted position.

In testimony whereof I have hereto affixed my signature on this 1st day of May, 1928.

LAURENCE M. LOEB.